United States Patent
Pieczonka et al.

(10) Patent No.: US 10,411,252 B2
(45) Date of Patent: Sep. 10, 2019

(54) POSITIVE ELECTRODE COMPOSITION, A POSITIVE ELECTRODE OF A LITHIUMION ELECTROCHEMICAL CELL, AND A METHOD OF FORMING THE POSITIVE ELECTRODE

(71) Applicant: GM GLOBAL TECHNOLOGY OPERATIONS LLC, Detroit, MI (US)

(72) Inventors: Nicholas P. W. Pieczonka, Windsor (CA); Jung-Hyun Kim, Novi, MI (US); Bob R. Powell, Jr., Birmingham, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 15/019,481

(22) Filed: Feb. 9, 2016

(65) Prior Publication Data
US 2017/0229705 A1    Aug. 10, 2017

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

| 4,576,883 A * | 3/1986 | Hope ............... H01M 6/181 429/215 |
| 2009/0061325 A1* | 3/2009 | Odani ............... H01M 4/0421 429/330 |

(Continued)

OTHER PUBLICATIONS

Pieczonka, Borgel, Ziv, Leifer, Dargel, Aurbach, Kim, Liu, Huang, Krachkovskiy,Goward, Halalay, Powell, and Manthiram; "Lithium Polyacrylate (LiPAA) as an Advanced Binder and a Passivating Agent for High-Voltage Li-Ion Batteries"; Adv. Energy Mater, 2015, 1501008, pp. 1-10.

(Continued)

*Primary Examiner* — Jonathan Crepeau
*Assistant Examiner* — Angela J Martin
(74) *Attorney, Agent, or Firm* — Quinn IP Law

(57) ABSTRACT

A positive electrode composition includes a binder material; an electrically conductive material dispersible in the binder material and comprising a plurality of conductive carbon particles; an active material dispersible in the binder material and comprising a plurality of active particles; and a coating agent comprising one of a non-lithiated polymer, an at least partially-lithiated polymer, and a fully-lithiated polymer. The coating agent is disposed on and at least partially encapsulates at least one of: each of the plurality of conductive carbon particles and each of the plurality of active particles. A positive electrode of a lithium ion electrochemical cell includes a current collector comprising aluminum and a layer formed from the positive electrode composition and disposed on the current collector. A method of forming the positive electrode is also disclosed.

15 Claims, 2 Drawing Sheets

(51) Int. Cl.
*H01M 4/48* (2010.01)
*H01M 4/50* (2010.01)
*H01M 4/58* (2010.01)
*H01M 4/62* (2006.01)
*H01M 4/66* (2006.01)
*H01M 10/05* (2010.01)
*H01M 10/0525* (2010.01)
*H01M 4/485* (2010.01)
*H01M 4/505* (2010.01)
*H01M 4/525* (2010.01)
*H01M 10/0568* (2010.01)

(52) U.S. Cl.
CPC .......... *H01M 4/485* (2013.01); *H01M 4/505* (2013.01); *H01M 4/525* (2013.01); *H01M 4/5825* (2013.01); *H01M 4/623* (2013.01); *H01M 4/625* (2013.01); *H01M 4/628* (2013.01); *H01M 4/661* (2013.01); *H01M 10/0525* (2013.01); *H01M 10/0568* (2013.01); *H01M 2220/10* (2013.01); *H01M 2220/20* (2013.01); *Y02E 60/122* (2013.01); *Y02T 10/7011* (2013.01)

(56) References Cited

U.S. PATENT DOCUMENTS

2014/0087250 A1* 3/2014 Coowar ................ H01M 4/134
429/211
2014/0242452 A1* 8/2014 Pieczonka ............ H01M 4/622
429/188
2014/0265557 A1 9/2014 Huang et al.

OTHER PUBLICATIONS

Akihisa Kajiyama, Ryuta Masaki, Tsuyoshi Wakiyama, Kazutoshi Matsumoto, Akira Yoda, Taro Inada, Hiroshi Yokota, and Ryoji Kanno; "Principal Factors of Carbon Conductive Agents that Contribute to be Gas Formation in High-Voltage Cathode Systems"; Journal of the Electrochemical Society; 2015; pp. A1516-A1522, vol. 162, Issue 8.

Biwei Xiao, Jian Liu, Qian Sun, Biqiong Wang, Mohammad Norouzi Banis, Dong Zhao, Zhiqiang Wang, Ruying Li, Xiaoyu Gui, Tsun-Kong Sham, Xueliang Sun; "Unraveling the Role of Electrochemically Active FePO4 Coating by Atomic Layer Deposition for Increased High-Voltage Stability of LiNi0.5Mn1.5O4 Cathode Material"; Adv. Sci., 2015, 2, 1500022, pp. 1-6.

* cited by examiner

POSITIVE ELECTRODE COMPOSITION, A POSITIVE ELECTRODE OF A LITHIUM ION ELECTROCHEMICAL CELL, AND A METHOD OF FORMING THE POSITIVE ELECTRODE

TECHNICAL FIELD

The disclosure relates to a positive electrode composition, a positive electrode of a lithium ion electrochemical cell, and a method of forming the positive electrode.

BACKGROUND

Batteries are useful for converting chemical energy into electrical energy, and may be described as primary or secondary. Primary batteries are generally non-rechargeable, whereas secondary batteries are readily rechargeable and may be restored to a full charge after use. As such, secondary batteries may be useful for applications such as powering electronic devices, tools, machinery, and vehicles.

One type of secondary battery, a lithium ion secondary battery, may include a negative electrode or anode, a positive electrode or cathode, and an electrolyte disposed between the positive and negative electrodes. The negative electrode may be formed from a material that is capable of incorporating and releasing lithium ions during charging and discharging of the lithium ion secondary battery. During charging of the battery, lithium ions may move from the positive electrode to the negative electrode and embed, e.g., by intercalation, insertion, substitutional solid solution strengthening, or other means, in the material. Conversely, during battery discharge, lithium ions may be released from the material and move from the negative electrode to the positive electrode.

SUMMARY

A positive electrode composition includes an electrically conductive material comprising a binder material; an electrically conductive material dispersible in the binder material and comprising a plurality of conductive carbon particles; an active material dispersible in the binder material and comprising a plurality of active particles; and a coating agent comprising one of a non-lithiated polymer, an at least partially-lithiated polymer, and a fully-lithiated polymer. The coating agent is disposed on and at least partially encapsulates at least one of: each of the plurality of active particles and each of the plurality of conductive carbon particles.

A positive electrode of a lithium ion electrochemical cell includes a current collector comprising aluminum and a layer disposed on the current collector and formed from the positive electrode composition.

A lithium ion electrochemical cell includes the positive electrode, a negative electrode spaced apart from the positive electrode, and an electrolyte disposed between the positive electrode and the negative electrode and comprising lithium hexafluorophosphate. A lithium ion secondary battery pack includes the lithium ion electrochemical cell, and an electronic device includes the lithium ion secondary battery pack.

A method of forming a positive electrode of a lithium ion electrochemical cell includes dispersing at least one of an electrically conductive material comprising a plurality of conductive carbon particles and an active material comprising a plurality of active particles in one of a non-lithiated polymer, an at least partially-lithiated polymer, and a fully-lithiated polymer to form a coating agent disposed on and at least partially encapsulating at least one of each of the plurality of conductive carbon particles and each of the plurality of active particles and thereby form a plurality of coated particles. The method also includes drying the plurality of coated particles to form a plurality of coated precursor particles. In addition, the method includes mixing the plurality of coated precursor particles and a binder material to form a slurry. The method further includes depositing the slurry onto a current collector comprising aluminum to thereby form the positive electrode.

For the present disclosure, "a," "an," "the," "at least one," and "one or more" are used interchangeably to indicate that at least one of the items is present. A plurality of such items may be present unless the context clearly indicates otherwise. "About" indicates that the stated numerical value or amount allows some slight imprecision, i.e., with some approach to exactness in the value; approximately or reasonably close to the value; nearly. If the imprecision provided by "about" is not otherwise understood with this meaning, then "about" as used herein indicates at least variations that may arise from methods of measuring and using such parameters. In addition, disclosure of ranges includes disclosure of all values and further divided ranges within the entire range. The terms "comprises," "comprising," "including," and "having" are inclusive and therefore specify the presence of stated items, but do not preclude the presence of other items. The term "or" includes any and all combinations of one or more of the associated listed items.

The above features and advantages and other features and advantages of the present disclosure will be readily apparent from the following detailed description of the preferred embodiments and best modes for carrying out the present disclosure when taken in connection with the accompanying drawings and appended claims.

DETAILED DESCRIPTION

Figure 1:
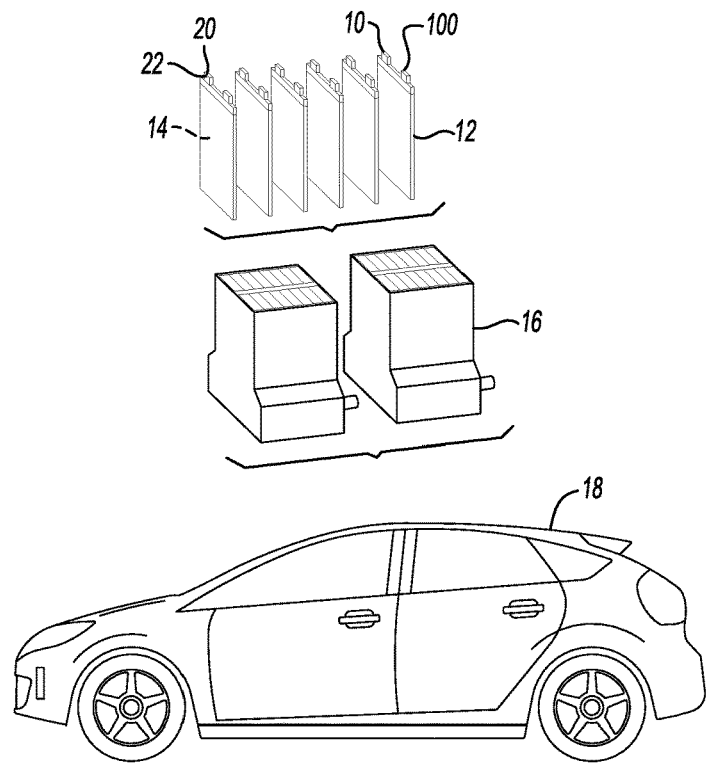
FIG. 1 is a schematic illustration of an exploded, perspective view of a positive electrode of a lithium ion electrochemical cell, a lithium ion secondary battery pack, and an electronic device.

Referring to the Figures, wherein like reference numerals refer to like elements, a positive electrode 10 or cathode of a lithium ion electrochemical cell 12 is shown generally in FIG. 1. The positive electrode 10 may be useful for applications requiring lithium ion electrochemical cells 12 having excellent electrical conductivity, mechanical integrity, specific capacity, performance, and operating life. Therefore, the positive electrode 10 may be useful for a variety of applications and electronic devices 18 requiring lithium ion electrochemical cells 12, such as, but not limited to, communication devices, tools, machinery, and vehicles. For example, the positive electrode 10 may be useful for lithium ion electrochemical cells 12 for electric and hybrid electric vehicles, recreational vehicles, aerospace applications, consumer electronics, and household and industrial power tools.

Referring to FIG. 1, for purposes of general explanation, the lithium ion electrochemical cell 12 may include the positive electrode 10, a negative electrode 100 or anode spaced apart from the positive electrode 10, and an electrolyte 14 disposed between the positive electrode 10 and the negative electrode 100. The electrolyte 14 may be a chemical medium that allows a flow of electrical charge between the positive electrode 10 and the negative electrode 100. By way of a non-limiting example, the electrolyte 14 may comprise or be formed from lithium hexafluorophosphate. The electrolyte 14 may not undergo oxidation and may not readily degrade, as set forth in more detail below.

Two or more of the lithium ion electrochemical cells 12 may be combined to form a lithium ion secondary battery pack 16. That is, the lithium ion secondary battery pack 16 of FIG. 1 may include the lithium ion electrochemical cell 12 of FIG. 1. For example, the lithium ion secondary battery pack 16 may be made up of two or more lithium ion secondary battery modules, which each made be made up of two or more lithium ion electrochemical cells 12. That is, the lithium ion secondary battery pack 16 may include at least one lithium ion electrochemical cell 12, but generally includes multiple lithium ion electrochemical cells 12 electrically connected to one another. Further, the electronic device 18 of FIG. 1 may include and be powered by the lithium ion secondary battery pack 16 of FIG. 1. The actual number of lithium ion electrochemical cells 12 may be expected to vary with the required voltage output of each lithium secondary battery pack 16. Likewise, the number of interconnected secondary battery packs 16 may vary to produce a necessary total output voltage for a specific application or electronic device 18.

In one non-limiting example, the lithium secondary battery pack 16 for a vehicular electronic device 18 is shown generally in FIG. 1. The lithium ion secondary battery pack 16 may be useful for automotive vehicle applications, recreational vehicle applications, or industrial vehicle applications, such as for a plug-in hybrid electric vehicle (PHEV). For example, the lithium ion secondary battery packs 16 for vehicle applications may be recharged external to the vehicle via a plug-in electrical outlet, or onboard the vehicle via a regenerative event.

Further, the lithium ion electrochemical cell 12 and the lithium ion secondary battery pack 16 may be characterized as high-voltage. That is, the lithium ion electrochemical cell 12 may have a comparatively high operating voltage, e.g., 4.75 V versus lithium. Therefore, the lithium ion secondary battery pack 16 may be combined with other lithium ion secondary battery packs 16 to provide a sufficient voltage for powering a hybrid electric vehicle (HEV), an electric vehicle (EV), a plug-in hybrid electric vehicle (PHEV), and the like, e.g., approximately 300 to 400 volts or more, depending on the required application.

The lithium ion electrochemical cell 12 may be suitable for stacking. That is, the lithium ion electrochemical cell 12 may be formed from a heat-sealable, flexible foil that is sealed to enclose at least a portion of the positive electrode 10, the negative electrode 100, the electrolyte 14, and a separator (not shown). Therefore, any number of lithium ion electrochemical cells 12 may be stacked or otherwise placed adjacent to each other to form a cell stack, i.e., the lithium ion secondary battery pack 16. Further, although not shown in FIG. 1, additional layers, such as, but not limited to, frames and cooling layers may also be positioned in the space between individual lithium ion electrochemical cells 12.

During operation, a chemical redox reaction may transfer electrons between a region of relatively negative potential to a region of relatively positive potential to thereby cycle, i.e., charge and discharge, the lithium ion electrochemical cells 12 within the lithium ion secondary battery pack 16 to provide voltage to power electronic devices 18. In particular, a plurality of lithium ions may transfer between the positive electrode 10 and the negative electrode 100 during charging and discharging of the lithium ion electrochemical cell 12.

Referring again to FIG. 1, the positive electrode 10 of the lithium ion electrochemical cell 12 includes a current collector 20 comprising aluminum, and a layer 22 disposed on the current collector 20. The layer 22 is formed from a positive electrode composition. The positive electrode composition includes an electrically conductive material comprising a plurality of conductive carbon particles. For example, the electrically conductive material may be a carbon black powder, a plurality of carbon fibers, graphene, graphite, a plurality of carbon nanotubes, and combinations thereof. By way of non-limiting examples, the plurality of conductive carbon particles may have a granular, particulate, powder, tubular, or fiber form. The electrically conductive material may ensure electrical connectivity between the current collector 20 and other components of the positive electrode composition. Further, the electrically conductive material may be present in the positive electrode composition in an amount of from 2 parts by weight to 15 parts by weight based on 100 parts by weight of the positive electrode composition. In one embodiment, the electrically conductive material may be present in an amount of 10 parts by weight based on 100 parts by weight of the positive electrode composition.

The positive electrode composition also includes an active material comprising a plurality of active particles. In general, the active material may be one or a combination of three types of materials: a layered oxide such as lithium cobalt oxide ($LiCoO_2$); a polyanion such as lithium iron phosphate; and a spinel such as lithium manganese oxide.

For example, the active material may be selected from the group consisting of lithium manganese compounds, lithium nickel compounds, lithium iron compounds, lithium cobalt compounds, and combinations thereof. More specifically, the active material may comprise a lithium transition metal compound characterized by the formula $LiMPO_4$, wherein M is at least one transition metal of the first row of transition metals in the periodic table of the elements, e.g., a transition metal selected from Mn, Fe, Ni, and Ti or a combination of these elements.

Other suitable active materials include lithium-containing transition metal compounds such as lithium-containing mixed transition metal oxides.

Other non-limiting examples of suitable active materials include lithium nickelate ($LiNiO_2$); lithium-containing nickel-cobalt-manganese oxides having a layer structure; manganese-containing spinels doped with one or more transition metals, including those having a formula $Li_aM_b Mn_{3-a-b}O_{4-d}$, wherein $0.9 \leq a \leq 1.3$, preferably $0.95 \leq a \leq 1.15$; $0 \leq b \leq 0.6$, and when M is Ni, preferably $0.4 \leq b \leq 0.55$; $-0.1 \leq d \leq 4$, preferably $0 \leq d \leq 0.1$; and M is selected from Al, Mg, Ca, Na, B, Mo, W, transition metals from the first row of the periodic table of the elements, and combinations of these, preferably Ni, Co, Cr, Zn, and Al, and more preferably, Ni; and manganese-containing mixed transition metal oxides with a layer structure especially including Mn, Co, and Ni.

Further, other suitable active materials include compounds characterized by at least one of the formulae $Li_{1+x}Ni_yCo_zMn_{1-x-y-z}O_2$; $LiMn_{1.5-x-y}Ni_xM_yO_4$; $LiNi_{1-x}M_xO_2$; and $LiFe_{1-x}M_xPO_4$, wherein $0 \leq x \leq 0.5$ and M is one or more of Li, Mg, Al, Ti, Cr, Mn, Fe, Co, Cu, Zn, and Mn.

In one embodiment, the active material may comprise a plurality of lithium nickel manganese oxide (LNMO) spinel active particles. As such, for this embodiment, the described lithium ion electrochemical cell 12 may be characterized as a high-voltage $LiNi_{0.5}Mn_{1.5}O_4$ electrochemical cell. The plurality of lithium nickel manganese oxide spinel active particles may have a powder form. More specifically, the plurality of lithium nickel manganese oxide spinel active particles may have any shape and size, and may be, for example, nanoparticles or micron-particles having an approximately spherical shape or an elongated shape.

The active material may be present in the positive electrode composition in an amount from 70 parts by weight to 96 parts by weight based on 100 parts by weight of the positive electrode composition. In one embodiment, the active material may be present in an amount of 80 parts by weight based on 100 parts by weight of the positive electrode composition. At amounts of less than about 70 parts by weight of the active material, the positive electrode 10 may not exhibit sufficient electrical conductivity for operation of the lithium ion electrochemical cell 12. Likewise, at amounts of greater than about 96 parts by weight of the active material, the layer 22 may not exhibit sufficient flexibility for lithiation and de-lithiation of the lithium ion electrochemical cell 12.

The positive electrode composition further includes a binder material. The binder material binds together the electrically conductive material and the active material. The electrically conductive material and the active material are dispersible in the binder material. Further, the binder material may be temperature-curable, e.g., hardenable, upon exposure to an increased ambient temperature. The binder material may be present in the positive electrode composition in an amount of from 2 parts by weight to 15 parts by weight based on 100 parts by weight of the positive electrode composition. In one embodiment, the binder material may be present in an amount of 10 parts by weight based on 100 parts by weight of the positive electrode composition. At amounts greater than about 15 parts by weight of the binder material, the positive electrode 10 may not exhibit sufficient electrical conductivity for operation of the lithium ion electrochemical cell 12.

The binder material may be water-soluble. Non-limiting examples of water-soluble binder material may include lithium polyacrylate, lithium polymethacrylate, lithium alginate, lithium carboxymethyl cellulose, lithium polyvinyl alcohol, lithium β-cyclodextrin, sodium polyacrylate, sodium polymethacrylate, sodium alginate, sodium carboxymethyl cellulose, sodium polyvinyl alcohol, sodium β-cyclodextrin, and combinations thereof.

In another embodiment, the binder material may be characterized as non-water-soluble. Rather, the binder material may be dissolvable in an organic material. For example, the binder material may be polyvinylidene fluoride and may be dissolvable in N-methyl-2-pyrrolidone.

In addition, the positive electrode composition also includes a coating agent comprising one of a non-lithiated polymer, an at least partially-lithiated polymer, and a fully-lithiated polymer. That is, the coating agent may comprise a non-lithiated polymer, a partially-lithiated polymer, or a fully-lithiated polymer. Stated differently, the polymer may be non-lithiated, may be only partly-lithiated, or may be completely lithiated.

The polymer includes at least one functional group selected from the group consisting of alkali and alkaline earth salts of acid groups and hydroxyl groups, amine groups, isocyanate groups, urethane groups, urea groups, amide groups, and combinations thereof.

Nonlimiting examples of the polymer including alkali and alkaline earth salts of acid groups or hydroxyl groups, and combinations of these groups, include homopolymers and copolymers such as:

(i) polymers, and the alkali and alkaline earth salts of these polymers, and copolymers of ethylenically unsaturated acids such as acrylic acid, methacrylic acid, crotonic acid, α-ethacrylic acid, vinylacetic acid, acryloxypropionic acid, maleic acid and its monoesters, itaconic acid and its monoesters, fumaric acid and its monoesters, mesaconic acid and its monoesters, citraconic acid and its monoesters, 4-vinylbenzoic acid and anhydrides of these, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, and the like, including polyacrylic acid, polymethacrylic acid, poly[ethylene-co-(maleic acid)], poly[styrene-co-(maleic acid)], poly[styrene-co-(acrylic acid)], poly[vinylpyridine-co-(methacrylic acid)], poly[(vinylidene chloride)-co-ethylene co-(acrylic acid)], poly[(methyl vinyl ether)-co-(maleic acid)], polyvinylbenzoic acid, and poly(perfluorosulfonic acid), poly[(vinyl chloride)-co-(vinyl acetate)-co-(maleic acid)], poly[(ethylene-co-(acrylic acid)], poly[(ethylene-co-(methacrylic acid)], as well as the alkali and alkaline earth salts of the reaction products of such polymers with a monoepoxide such as ethylene oxide;

(ii) polymers, and the alkali and alkaline earth salts of these polymers, of carboxylated polyvinyl chloride;

(iii) polymers, and the alkali and alkaline earth salts of these polymers, of polyvinyl alcohol and copolymers with vinyl alcohol monomer units, such as the copolymer of ethylene and vinyl alcohol;

(iv) polymers, and the alkali and alkaline earth salts of these polymers, of polysaccharides such as cellulose and its derivatives, such as partially hydrolyzed cellulose esters and ethers, hydroxyethyl cellulose, hydroxypropyl cellulose, hydroxypropyl methyl cellulose, hydroxybutyl methyl cellulose, carboxymethyl cellulose, and alkali and alkaline earth metal alginates;

(v) polymers, and the alkali and alkaline earth salts of these polymers, of polyundecylenol; copolymers of olefins and undecylenol; polyundecylenic acid and copolymers of olefins and undecylenic acid;

(vi) alkali and alkaline earth salts of maleated or fumerated polymers and monoesters of these polymers, such as maleated polyolefins such as maleated polypropylene and maleated polyethylene, maleated ethylene-vinyl acetate copolymers, maleated ethylene-methyl acrylate copolymers, maleated ethylene-propylene copolymers, maleated styrene-ethylene-butene-styrene triblock copolymers, maleated polybutadiene, and maleated ethylene-propylene-diene copolymers;

(vii) polymers, and the alkali and alkaline earth salts of these polymers, of homopolymers and copolymers of ethylenically unsaturated alcohols such as hydroxyethyl acrylate, hydroxyethyl methacrylate, hydroxypropyl acrylate, hydroxypropyl methacrylate, hydroxybutyl acrylate, hydroxybutyl methacrylate, polyglycol esters of ethylenically unsaturated acids such as poly(ethylene glycol) acrylate, vinylbenzyl alcohol, and allyl alcohol, for example, polyvinylbenzyl alcohol, poly[styrene-co-(allyl alcohol)], polyallyl alcohol, polymethyl allyl alcohol, poly[vinylpyridine-co-(allyl alcohol)], poly[ethylene-co-(allyl alcohol)], and poly[styrene-co-(hydroxyethyl methacrylate)];

(viii) polymers, and the alkali and alkaline earth salts of these polymers, of phenoxy resins; and (ix) polymers, and the alkali and alkaline earth salts of these polymers, of cyclodextrins, hydroxypropyl cyclodextrins, and hydroxyethyl cyclodextrins.

These examples (i)-(ix) may also be used in any combination.

Nonlimiting examples of homopolymers and copolymers having amine groups, isocyanate groups, urethane groups, urea groups, amide groups, and combinations of these include:

(i) amine-functional polyamides, alkali and alkaline earth carboxylate-functional polyamides, and polyamides in which carbonyl groups have been reduced via deoxygenation to form polyamines, including amine-functional Nylon-6, Nylon 6,6, Nylon 6,9, Nylon 6,10, Nylon 6,12, and Nylon 11 and the polyamines derived by reduction therefrom, as well as hydroxyalkylated polyamides and polyamines, such as hydroxymethyl, hydroxyethyl, and hydroxypropyl polyamides;

(ii) vinyl polymers and copolymers having pendent amino groups, such as any of polyvinylpyrrolidone, polyvinylpyrrolidine, and polyvinylhydroxyalkylatedpyrrolidones reduced via deoxygenation to polyamines, poly[(vinylidene chloride)-co-(allyl amine)], polyallylamine, polyvinylbenzylamine, polyvinylpyridine, polyvinylcarbazole, poly(styrene-co-allylamine], poly(vinylpyridine-co-styrene), poly[vinylpyridine-co-(acrylic acid)], poly[vinylpyridine-co-(methacrylic acid)], and poly[(methylvinyl ether)-alt-maleimide];

(iii) polyethyleneimines (linear or branched) and hydroxyalkylated polyethyleneimines where the hydroxyalkyl group is hydroxymethyl, hydroxyethyl, hydroxypropyl, and so on;

(iv) aminoalkylated celluloses, such as aminoethylated cellulose;

(v) polyacrylamide, hydroxyl-modified polyacrylamide, and polymethacrylamide;

(vi) polyvinylpyrrolidone and poly[vinylpyrrolidone-co-(vinyl alcohol)];

(vii) poly(2-ethyl-2-oxazoline) and polymers derived from hydrolysis of poly(2-ethyl-2-oxazoline);

(viii) polyamides terminated by polyamines such as diethylenetriamine and triethylenetetraamine;

(ix) poly(2-acrylamido-2-methyl-1-propanesulfonic acid);

(x) polyurethanes, which may be prepared from diisocyanates such as isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), the various isomers of toluene diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and biurets of these and combinations of these and polyols, particularly diols, such as ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 1,5-pentanediol, 1,3-propanediol, butylene glycol, neopentyl glycol, dihydroxyalkylated aromatic compounds such as the bis (2-hydroxyethyl) ethers of hydroquinone and resorcinol; p-xylene-α,α'-diol; the bis (2-hydroxyethyl) ether of p-xylene-α,α'-diol; m-xylene-α,α'-diol, polymeric diols such as polyethers, polyesters, and polycarbonates, and others including, for example, polyethylene glycol, polybutadienediol, hydrogenated polybutadienediol, and so on, and combinations of these, and may be used as either hydroxyl-terminated or isocyanate-terminated polymers;

(xi) polyureas, which may be prepared from diisocyanates such as those already mentioned and diamines such as unsaturated diamines such as 4,4'-diamino-diphenylmethane (i.e., 4,4'-methylene-dianiline or "MDA") and dianiline (diphenylamine); hexanediamine, oxy-dianiline ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, poly(oxyethylene-oxypropylene)diamines, 1,3- or 1,4-bis(methylamino)-cyclohexane, isophorone diamine, 1,2- or 1,4-bis (sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, polytetramethylene ether diamines, 3,3',5,5'-tetraethyl-4,4'-diamino-dicyclohexylmethane (i.e., 4,4'-methylene-bis(2,6-diethylaminocyclohexane)), 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine;

(xii) melamine formaldehyde polymers and urea formaldehyde polymers;

(xiii) hydroxyalkylated polyamides and polyamines; and (xix) hydroxyalkoxyalkylated polyamides and polyamines.

These examples (i)-(xix) may also be used in any combination.

The coating agent is disposed on and at least partially encapsulates at least one of: each of the plurality of active particles and each of the plurality of conductive carbon particles. That is, the coating agent may partially or completely surround at least one of: 1) each of the plurality of conductive carbon particles and 2) each of the plurality of active particles. Such partial or complete encapsulation may passivate or protect at least one of each of the plurality of conductive carbon particles and each of the plurality of active particles. For embodiments in which the coating agent is disposed on and completely encapsulates at least one of each of the plurality of conductive carbon particles and each of the plurality of active particles, the coating agent provides complete and uniform coverage of at least one of the electrically conductive material and the active material.

For example, the coating agent may only be disposed on and partially encapsulate the electrically conductive material, i.e., each of the plurality of conductive carbon particles.

Alternatively, the coating agent may only be disposed on and partially encapsulate the active material, i.e., each of the plurality of active particles, e.g., each of the plurality of lithium nickel manganese oxide spinel active particles. In another embodiment, the coating agent may be disposed on and partially encapsulate both the electrically conductive material and the active material, i.e., each of the plurality of conductive carbon particles and each of the plurality of active particles.

In another embodiment, the coating agent may only be disposed on and completely encapsulate the electrically conductive material, i.e., each of the plurality of conductive carbon particles. Alternatively, the coating agent may only be disposed on and completely encapsulate the active material, i.e., each of the plurality of active particles, e.g., each of the plurality of lithium nickel manganese oxide spinel active particles. In another embodiment, the coating agent may be disposed on and completely encapsulate both the electrically conductive material and the active material, i.e., each of the plurality of conductive carbon particles and each of the plurality of active particles.

The coating agent ensures that the electrolyte 14 does not undergo oxidation at a surface of one or both of the active material and the electrically conductive material. That is, even though the positive electrode 10 is surrounded by an oxidizing environment during operation of the lithium ion electrochemical cell 12, the coating agent disposed on and at least partially encapsulating either or both of each of the plurality of conductive carbon particles and each of the plurality of active particles forms a stable cathode-electrolyte solution interface (CEI), which mitigates oxidation of the electrolyte 14. For example, the coating agent may minimize side reaction byproducts such as hydrogen fluoride, phosphorus pentafluoride, phosphoric trifluoride, metal fluorides, manganese dioxide, $Mn^{2+/3+}/Ni^{2+}$ β-didetonate coordination complexes, and polymeric species that may otherwise increase impedance of the lithium ion electrochemical cell 12 and consume active lithium ions via parasitic reactions during operation of the lithium ion electrochemical cell 12.

Without the coating agent disposed on and at least partially encapsulating either or both of each of the plurality of conductive carbon particles and each of the plurality of active particles, such reaction byproducts may otherwise deposit on a cathode, dissolve into the electrolyte 14, migrate to the anode, and destroy the integrity of a graphite solid electrolyte interface (SEI). Stated differently, the coating agent may passivate the surfaces of the active material particles and/or the electrically conductive material particles. As such, the coating agent and disclosed positive electrode 10 minimizes degradation, premature inoperability, and specific capacity loss of the lithium ion electrochemical cell 12, especially after prolonged cycling, i.e., greater than 100 charge-discharge cycles, of the lithium ion electrochemical cell 12 at high temperatures, i.e., greater than 30° C.

The polymer of the coating agent may be selected according to molecular weight. For example, the one of the non-lithiated polymer, the at least partially-lithiated polymer, and the fully-lithiated polymer may have a number average molecular weight of from about 4,000 g/mol to about 110,000 g/mol. That is, the polymer may have a comparatively short polymer chain and may have a number average molecular weight of from about 5,000 g/mol to about 100,000 g/mol. In one embodiment, the polymer is lithium polyacrylate and the layer 22 has a thickness of from 0.1 nm to 25 nm, wherein 1 nm is equal to $1 \times 10^{-9}$ m. In another embodiment, the polymer is lithium poly(acrylate-co-malate), and the layer 22 has a thickness of from 0.1 nm to 25 nm. That is, for embodiments including lithium polyacrylate disposed on and at least partially encapsulating at least one of the electrically conductive material and the active material, the layer 22 is thicker than a comparative layer 22 including lithium poly(acrylate-co-malate) due to a higher viscosity of the lithium polyacrylate.

Figure 2:
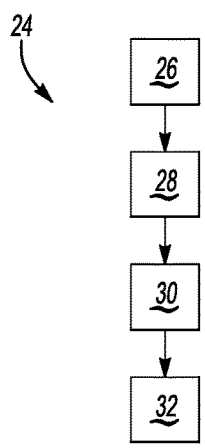
FIG. 2 is a flowchart of a method of forming the positive electrode of FIG. 1.

Referring now to FIG. 2, a method 24 of forming the positive electrode 10 of the lithium ion electrochemical cell 12 includes dispersing 26 at least one of the electrically conductive material and the active material in one of the non-lithiated polymer, the at least partially-lithiated polymer, and the fully-lithiated polymer to form the coating agent disposed on and at least partially encapsulating at least one of each of the plurality of conductive carbon particles and each of the plurality of active particles to thereby form a plurality of coated particles. For example, dispersing 26 may include combining the plurality of conductive carbon particles and the plurality of lithium nickel manganese oxide spinel active particles with a solution of one of the non-lithiated polymer, the at least partially-lithiated polymer, and the fully-lithiated polymer to form a mixture. The method 24 may include stirring the polymer, the plurality of conductive carbon particles, and the plurality of active particles to sufficiently disperse the plurality of conductive carbon particles and the plurality of active particles in the one of the non-lithiated polymer, the at least partially-lithiated polymer, and the fully-lithiated polymer. Further, after stirring, the method 24 may include filtering the mixture to form the plurality of coated particles.

The method 24 also includes drying 28 the plurality of coated particles to form a plurality of coated precursor particles. In one embodiment, drying 28 may include dehydrating the plurality of coated particles under vacuum. That is, drying 28 may include removing substantially all moisture from the plurality of coated particles to thereby form the plurality of coated precursor particles.

Referring again to FIG. 2, the method 24 also includes mixing 30 the plurality of coated precursor particles and the binder material to form a slurry. For embodiments in which the binder material is characterized as non-water-soluble, the method 24 may include mixing 30 the plurality of coated precursor particles, the binder material, and a solvent comprising, for example, N-methyl-2-pyrrolidone to form the slurry. Further, the method 24 includes depositing 32 the slurry onto the current collector 20 to thereby form the positive electrode 10. For example, depositing 32 may include slot die coating the slurry onto the current collector 20 with a doctor blade.

The disclosed positive electrodes 10 and lithium ion electrochemical cells 12 exhibit improved durability, i.e., retained specific capacity over cycling; cycle life; and specific capacity. In particular, the coating agent prevents electrolyte decomposition species from fouling the plurality of active material particles and the plurality of electrically conductive material particles. That is, the coating agent comprising one of the non-lithiated polymer, the at least partially-lithiated polymer, and the fully-lithiated polymer provides a protective barrier for the positive electrode 10 that limits oxidation and degradation of the electrolyte 14. The polymer may also provide a source of lithium ions that compensates for any lithium ion loss during operation of the lithium ion electrochemical cell 12. In addition, the polymer may scavenge acidic protons from the electrolyte 14 and extend the cycle life and operating life of the lithium ion electrochemical cell 12. The coating agent also provides the positive electrode 10 and lithium ion electrochemical cell 12 with thermal stability and durability. In addition, the coating agent is economical and efficient for coating one or both of the active material and the electrically conductive material.

The following examples illustrate the disclosed technology and are not to be viewed in any way as limiting to the scope of the disclosure.

EXAMPLES

Example 1

Preparation of a Positive Electrode Comprising a Lithium Polyacrylate Coating Agent Disposed on and at Least Partially Encapsulating Conductive Carbon Particles A polymer, i.e., lithium polyacrylate, is prepared by ion exchange. The lithium polyacrylate is neutralized by adding equimolar amounts of LiOH to aqueous solutions of polyacrylic acid for a final solution pH of 7. The aqueous solutions of polyacrylic acid are prepared from a 25 wt % solution in water, have a number average molecular weight of about 240,000 g/mol, and are commercially available from Alfa Aesar of Haverhill, Mass.

To form a plurality of coated particles of Example 1, 85 parts by weight of carbon black particles, commercially available under the tradename of Super P® from Timcal of Cleveland, Ohio, are dispersed in 15 parts by weight of the polymer by stirring to form a mixture. The mixture is filtered to form the plurality of coated particles. The plurality of coated particles are dried in a vacuum oven to form a plurality of coated precursor particles.

Ten parts by weight of the plurality of coated precursor particles, 80 parts by weight of the active material, and 10 parts by weight of a polyvinylidene fluoride binder material, commercially available under the tradename Kynar® HSV900 from Arkema, Inc. of King of Prussia, Pa., are mixed with N-methyl-2-pyrrolidone to form a slurry. The slurry is deposited onto an aluminum current collector, commercially available from Strem Chemicals, Inc. of Newburyport, Mass., using a doctor blade to form a cathode sheet. The cathode sheet is dried overnight at 100° C. under vacuum.

After drying overnight, the cathode sheet is roll-pressed to reduce a thickness of the cathode sheet and control a porosity of the cathode sheet. After roll-pressing, the cathode sheet is cut into a disk having a diameter of 12.7 mm. The disk is dried overnight at 100° C. to remove adsorbed moisture and form the positive electrode of Example 1.

Example 2

Preparation of a Lithium Ion Electrochemical Cell Comprising the Positive Electrode of Example 1

An anode is prepared by mixing together 89 parts by weight of graphite powder, commercially available under the tradename CPreme® from ConocoPhillips Co. of Houston, Tex., 4 parts by weight of non-coated Super P® carbon black particles, and 7 parts by weight of the polyvinylidene fluoride binder material to form a slurry. The slurry is deposited onto a copper current collector, commercially available from Schlenk USA of Ashland, Mass., using a doctor blade to form an anode sheet. The anode sheet is dried overnight at room temperature in air, and then dried overnight again at 100° C. in a vacuum oven.

After drying overnight at 100° C. in the vacuum oven, the anode sheet is roll-pressed to reduce a thickness of the anode sheet and control a porosity of the anode sheet. After roll-pressing, the anode sheet is cut into a disk having a diameter of 12.7 mm. The disk is dried overnight at 100° C. to remove adsorbed moisture and form the anode.

A polypropylene separator, commercially available from Celgard, LLC of Charlotte, N.C., is assembled between the positive electrode of Example 1 and the anode using 1 mole of lithium hexafluorophosphate-ethylene carbonate-ethyl methyl carbonate electrolyte solution (1:1 volume ratio), commercially available from BASF Corporation of Florham Park, N.J., in 2032 coin-type cells, commercially available from Hohsen Co. of Osaka, Japan, in a highly pure argon atmosphere in a glove box to form the lithium ion electrochemical cell of Example 2.

Example 3

Preparation of a Positive Electrode Comprising a Lithium Polyacrylate Coating Agent Disposed on and At Least Partially Encapsulating a Plurality of Active Particles To form a plurality of coated particles of Example 3, 93 parts by weight of a plurality of lithium nickel manganese oxide spinel active particles are dispersed in 7 parts by weight of the polymer by stirring to form a mixture. The mixture is filtered to form the plurality of coated particles. The plurality of coated particles are dried in a vacuum oven to form a plurality of coated precursor particles.

Eighty parts by weight of the plurality of coated precursor particles, 10 parts by weight of non-coated Super P® carbon black particles, and 10 parts by weight of the polyvinylidene fluoride binder material are mixed with N-methyl-2-pyrrolidone and water to form a slurry. The slurry is deposited onto an aluminum current collector, commercially available from Strem Chemicals, Inc. of Newburyport, Mass., using a doctor blade to form a cathode sheet. The cathode sheet is dried overnight at 100° C. in air.

After drying overnight, the cathode sheet is roll-pressed to reduce a thickness of the cathode sheet and control a porosity of the cathode sheet. After roll-pressing, the cathode sheet is cut into a disk having a diameter of 12.7 mm. The disk is dried overnight at 100° C. to remove adsorbed moisture to form the positive electrode of Example 3.

Example 4

Preparation of a Lithium Ion Electrochemical Cell Comprising the Positive Electrode of Example 3

An anode is prepared by mixing together 89 parts by weight of graphite powder, commercially available under the tradename CPreme-G8® from ConocoPhillips Co. of Houston, Tex., 4 parts by weight of non-coated Super P® carbon black particles, and 7 parts by weight of the polyvinylidene fluoride binder material to form a slurry. The slurry is deposited onto a copper current collector, commercially available from Schlenk USA of Ashland, Mass., using a doctor blade to form an anode sheet. The anode sheet is dried overnight at room temperature in air, and then dried overnight again at 100° C. in a vacuum oven.

After drying overnight at 100° C. in the vacuum oven, the anode sheet is roll-pressed to reduce a thickness of the anode sheet and control a porosity of the anode sheet. After roll-pressing, the anode sheet is cut into a disk having a diameter of 12.7 mm. The disk is dried overnight at 100° C. to remove adsorbed moisture and form the anode.

A polypropylene separator, commercially available from Celgard, LLC of Charlotte, N.C. is assembled between the positive electrode of Example 3 and the anode using 1 mole of lithium hexafluorophosphate-ethylene carbonate-ethyl methyl carbonate electrolyte solution (1:1 volume ratio), commercially available from BASF Corporation of Florham Park, N.J., in 2032 coin-type cells, commercially available from Hohsen Co. of Osaka, Japan, in a highly pure argon atmosphere in a glove box to form the lithium ion electrochemical cell of Example 4.

Comparative Example 5

Preparation of a Positive Electrode Comprising Non-Coated Conductive Carbon Particles and Non-Coated Active Particles Ten parts by weight of non-coated Super P® carbon black particles, 80 parts by weight of the active material, and 10 parts by weight of the polyvinylidene fluoride binder material are mixed with N-methyl-2-pyrrolidone to form a slurry. The slurry is deposited onto an aluminum current collector, commercially available from Strem Chemicals, Inc. of Newburyport, Mass., using a doctor blade to form a cathode sheet. The cathode sheet is dried overnight at 100° C. in air.

After drying overnight, the cathode sheet is roll-pressed to reduce a thickness of the cathode sheet and control a porosity of the cathode sheet. After roll-pressing, the cathode sheet is cut into a disk having a diameter of 12.7 mm. The disk is dried overnight at 100° C. to remove adsorbed moisture and form the positive electrode of Comparative Example 5.

Comparative Example 6

Preparation of a Lithium Ion Electrochemical Cell Comprising the Positive Electrode of Example 5

An anode is prepared by mixing together 89 parts by weight of graphite powder, commercially available under the tradename CPreme-G8® from ConocoPhillips Co. of Houston, Tex., 4 parts by weight of non-coated Super P® carbon black particles, and 7 parts by weight of the polyvinylidene fluoride binder material to form a slurry. The slurry is deposited onto a copper current collector, commercially available from Schlenk USA of Ashland, Mass., using a doctor blade to form an anode sheet. The anode sheet is dried overnight at room temperature in air, and then dried overnight again at 100° C. in a vacuum oven.

After drying overnight at 100° C. in the vacuum oven, the anode sheet is roll-pressed to reduce a thickness of the anode sheet and control a porosity of the anode sheet. After roll-pressing, the anode sheet is cut into a disk having a diameter of 12.7 mm. The disk is dried overnight at 100° C. to remove adsorbed moisture and form the anode.

A polypropylene separator, commercially available from Celgard, LLC of Charlotte, N.C., is assembled between the positive electrode of Example 5 and the anode using 1 mole of lithium hexafluorophosphate-ethylene carbonate-ethyl methyl carbonate electrolyte solution (1:1 volume ratio), commercially available from BASF Corporation of Florham Park, N.J., in 2032 coin-type cells, commercially available from Hohsen Co. of Osaka, Japan, in a highly pure argon atmosphere in a glove box to form the lithium ion electrochemical cell of Comparative Example 6.

Evaluation of a Specific Capacity of the Lithium Ion Electrochemical Cells

The lithium ion electrochemical cells of Examples 2 and 4 and Comparative Example 6 are evaluated for specific capacity using a multichannel battery tester, commercially available from Arbin Instruments, Inc. of College Station, Tex., in a voltage range of from 3.4 V to 4.8 V at 30° C. for two cycles at a C/10-rate, followed by 100 cycles at a C/5-rate.

Figure 3:
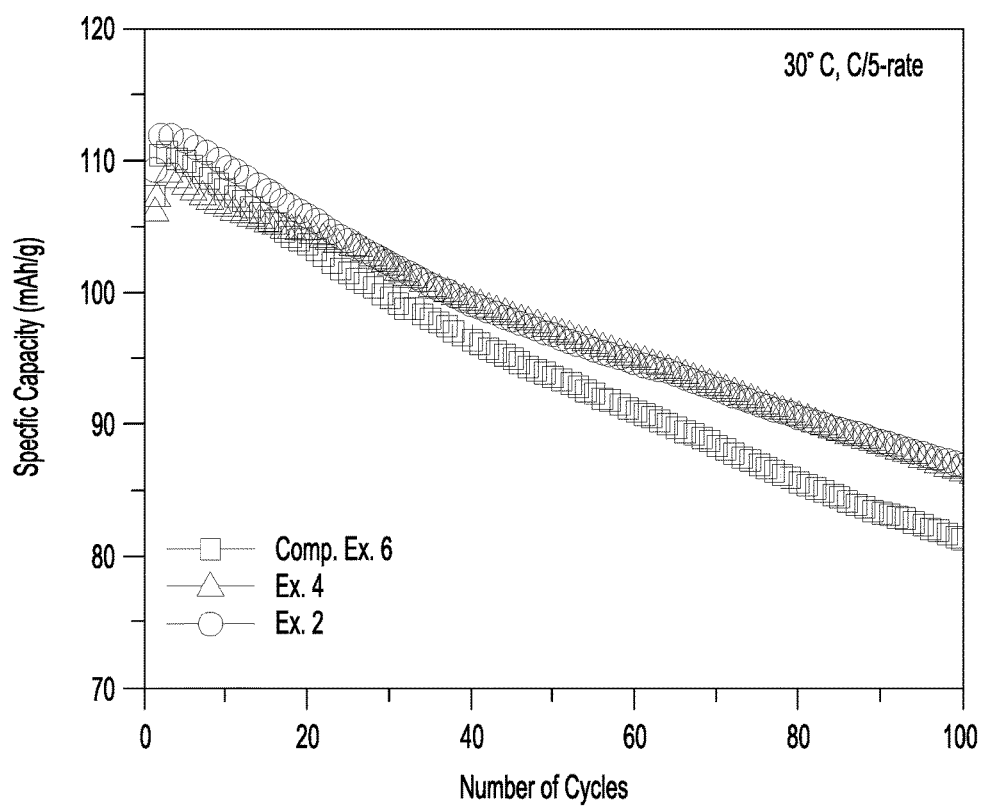
FIG. 3 is a graphical representation of a relationship between specific capacity and number of cycles for the lithium ion electrochemical cells of Examples 2 and 4 and Comparative Example 6.

A relationship between the specific capacity and the number of cycles for the lithium ion electrochemical cells of Examples 2 and 4 and Comparative Example 6 is illustrated in FIG. 3. Referring to FIG. 3, after about 20 cycles, the lithium ion electrochemical cells of Examples 2 and 4, which include a positive electrode comprising the polymer coating agent disposed on and at least partially encapsulating the electrically conductive material and the active material, respectively, have a higher specific capacity than the lithium ion electrochemical cell of Comparative Example 6, which includes a positive electrode that does not comprise the polymer coating agent.

While the best modes for carrying out the disclosure have been described in detail, those familiar with the art to which this disclosure relates will recognize various alternative designs and embodiments for practicing the disclosure within the scope of the appended claims.

The invention claimed is:

1. A positive electrode composition comprising:
   a binder material;
   an electrically conductive material dispersible in the binder and comprising a plurality of conductive carbon particles;
   an active material dispersible in the binder and comprising a plurality of active particles; and
   a coating agent that is different from the binder material and comprises one of lithium polyacrylate and lithium poly(acrylate-co-malate), wherein the coating agent is disposed on and encapsulates: only a) each of the plurality of conductive carbon particles or only b) each of the plurality of active particles to form a plurality of coated particles dispersed in, surrounded by, and in contact with the binder material.

2. The positive electrode composition of claim 1, wherein the binder material is present in an amount of from 2 parts by weight to 15 parts by weight based on 100 parts by weight of the positive electrode composition.

3. The positive electrode composition of claim 2, wherein the electrically conductive material is present in an amount of from 2 parts by weight to 15 parts by weight based on 100 parts by weight of the positive electrode composition.

4. The positive electrode composition of claim 3, wherein the active material is present in an amount of from 70 parts by weight to 96 parts by weight based on 100 parts by weight of the positive electrode composition.

5. The positive electrode composition of claim 1, wherein the binder material is polyvinylidene fluoride.

6. The positive electrode composition of claim 1, wherein the active material is selected from the group consisting of lithium manganese compounds, lithium nickel compounds, lithium iron compounds, lithium cobalt compounds, and combinations thereof.

7. A positive electrode of a lithium ion electrochemical cell, the positive electrode comprising:

a current collector comprising aluminum;
a layer disposed on the current collector, wherein the layer is formed from a positive electrode composition comprising:
a binder material;
an electrically conductive material comprising a plurality of conductive carbon particles;
an active material comprising a plurality of active particles; and
a coating agent that is different from the binder material and comprises one of lithium polyacrylate and lithium poly(acrylate-co-malate), wherein the coating agent is disposed on and encapsulates: only a) each of the plurality of conductive carbon particles or only b) each of the plurality of active particles to form a plurality of coated particles dispersed in, surrounded by, and in contact with the binder material.

8. The positive electrode of claim 7, wherein the layer has a thickness of from 0.1 nm to 25 nm.

9. The positive electrode of claim 7, wherein the layer has a thickness of from 0.1 nm to 25 nm.

10. A lithium ion electrochemical cell comprising the positive electrode of claim 7; a negative electrode spaced apart from the positive electrode; and an electrolyte disposed between the positive electrode and the negative electrode and comprising lithium hexafluorophosphate.

11. A lithium ion secondary battery pack comprising the lithium ion electrochemical cell of claim 10.

12. An electronic device comprising the lithium ion secondary battery pack of claim 11.

13. A method of forming a positive electrode of a lithium ion electrochemical cell, the method comprising:
dispersing one of:
an electrically conductive material comprising a plurality of conductive carbon particles; and
an active material comprising a plurality of active particles;
in one of lithium polyacrylate and lithium poly(acrylate-co-malate) to form a coating agent disposed on and encapsulating: only a) each of the plurality of conductive carbon particles or only b) each of the plurality of active particles to thereby form a plurality of coated particles;
drying the plurality of coated particles to form a plurality of coated precursor particles;
mixing the plurality of coated precursor particles and a binder material that is different from the coating agent to form a slurry that includes the plurality of coated precursor particles dispersed in, surrounded by, and in contact with the binder material; and
depositing the slurry onto a current collector comprising aluminum to thereby form the positive electrode.

14. The method of claim 13, wherein depositing includes slot die coating the slurry onto the current collector.

15. The method of claim 13, wherein drying includes dehydrating the plurality of coated particles under vacuum.

* * * * *